United States Patent
Sreedhar et al.

(10) Patent No.: US 11,704,249 B2
(45) Date of Patent: Jul. 18, 2023

(54) FROZEN TIME CACHE FOR MULTI-HOST READ OPERATIONS

(71) Applicant: Western Digital Technologies, Inc., San Jose, CA (US)

(72) Inventors: Adarsh Sreedhar, Karnataka (IN); Ramanathan Muthiah, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/354,168

(22) Filed: Jun. 22, 2021

(65) Prior Publication Data

US 2022/0405206 A1    Dec. 22, 2022

(51) Int. Cl.
*G06F 12/0862*    (2016.01)
*G06F 3/06*    (2006.01)

(52) U.S. Cl.
CPC ........ *G06F 12/0862* (2013.01); *G06F 3/0604* (2013.01); *G06F 3/0659* (2013.01); *G06F 3/0679* (2013.01); *G06F 2212/602* (2013.01)

(58) Field of Classification Search
CPC .. G06F 12/0862; G06F 3/0604; G06F 3/0659; G06F 2212/602; G06F 3/0679
See application file for complete search history.

(56) References Cited

U.S. PATENT DOCUMENTS

| | | | |
|---|---|---|---|
| 7,873,791 B1 | 1/2011 | Yu | |
| 8,713,261 B1 | 4/2014 | Aharoni et al. | |
| 9,612,966 B2 | 4/2017 | Joshi et al. | |
| 10,387,318 B2 | 8/2019 | Hooker et al. | |
| 2009/0199190 A1* | 8/2009 | Chen | G06F 9/383 718/102 |
| 2012/0311270 A1* | 12/2012 | Sun | G06F 12/0862 711/E12.004 |
| 2014/0101388 A1* | 4/2014 | McCauley | G06F 12/0862 711/137 |
| 2017/0300418 A1* | 10/2017 | Reed | G06F 12/128 |
| 2020/0192602 A1 | 6/2020 | Benisty et al. | |

* cited by examiner

*Primary Examiner* — Baboucarr Faal
(74) *Attorney, Agent, or Firm* — ArentFox Schiff LLP

(57) ABSTRACT

Aspects of a storage device including a memory and a controller are provided. The controller may receive a prefetch request to retrieve data for a host having a promoted stream. The controller may access a frozen time table indicating hosts for which data has been prefetched and frozen times associated with the host and other hosts. The controller can determine whether the host has a higher priority over other hosts included in the frozen time table based on corresponding frozen times and data access parameters associated with the host. The controller may determine to prefetch the data for the host in response to the prefetch request when the host has a higher priority than the other hosts. The controller can receive a host read command associated with the promoted stream from the host and provide the prefetched data to the host in response to the host read command.

20 Claims, 9 Drawing Sheets

FROZEN TIME CACHE FOR MULTI-HOST READ OPERATIONS

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of Not-And (NAND) flash memory cells on one or more dies. Flash memory may be found in solid-state devices (SSDs), Secure Digital (SD) cards, Universal Serial Bus (USB) cards, and the like.

In high-performance products such as client and enterprise SSDs, a cache of read-look-ahead (RLA) data may be provided to reduce read access latency. However, significant latency issues can still arise within SSDs that employ such caches, and it would be desirable to provide solutions to these and other issues. For example, legacy stream management mechanisms are designed to serve a single host. However, when serving a multitude of clients (hosts), these mechanisms may be suboptimal and may lead to delayed (sequential or random) read latencies and impaired throughput.

SUMMARY

One aspect of a storage device is disclosed herein. The storage device includes a memory and a controller. The controller is configured to receive a prefetch request to retrieve data for a first host device having a promoted stream. The controller is configured to access a frozen time table indicating a plurality of host devices for which data has been prefetched from the memory. In some aspects, the frozen time table further indicates a plurality of frozen times associated with respective ones of the plurality of host devices. The controller is configured to determine whether the first host device has priority over a second host device included in the frozen time table based on a corresponding one of the plurality of frozen times and one or more data access parameters associated with the first host device. The controller is configured to determine to prefetch the data for the first host device in response to the prefetch request when the first host device is determined to have priority over the second host device. The controller is configured to receive a host read command associated with the promoted stream from the first host device. The controller is configured to provide the prefetched data to the first host device in response to the host read command.

Another aspect of a storage device is disclosed herein. The storage device includes a memory and a controller. The memory includes non-volatile memory. The controller is configured to receive a prefetch request to retrieve data for a first host device having a promoted stream. The controller is configured to access a frozen time table indicating a plurality of host devices for which data has been prefetched from the non-volatile memory. In some aspects, the frozen time table further indicates a plurality of frozen times associated with respective ones of the plurality of host devices. The controller is configured to determine to prefetch the data for the first host device in response to the prefetch request based on the first host device having a higher priority than a second host device included in the frozen time table. In some aspects, the first host device and the second host device are prioritized within the frozen time table based on respective ones of the plurality of frozen times and one or more data access parameters associated with each of the first host device and the second host device. The controller is configured to receive a host read command associated with the promoted stream from the first host device. The controller is configured to provide the prefetched data to the first host device in response to the host read command.

A further aspect of a storage device is disclosed herein. The storage device includes means for receiving a prefetch request to retrieve data for a first host device having a promoted stream. The storage device includes means for accessing a frozen time table indicating a plurality of host devices for which data has been prefetched from non-volatile memory. In some aspects, the frozen time table further indicates a plurality of frozen times associated with respective ones of the plurality of host devices. The storage device includes means for determining whether the first host device has priority over a second host device included in the frozen time table based on a corresponding one of the plurality of frozen times and one or more data access parameters associated with the first host device. The storage device includes means for determining to prefetch the data for the first host device in response to the prefetch request when the first host device is determined to have priority over the second host device. The storage device includes means for receiving a host read command associated with the promoted stream from the first host device. The storage device includes means for providing the prefetched data to the first host device in response to the host read command.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
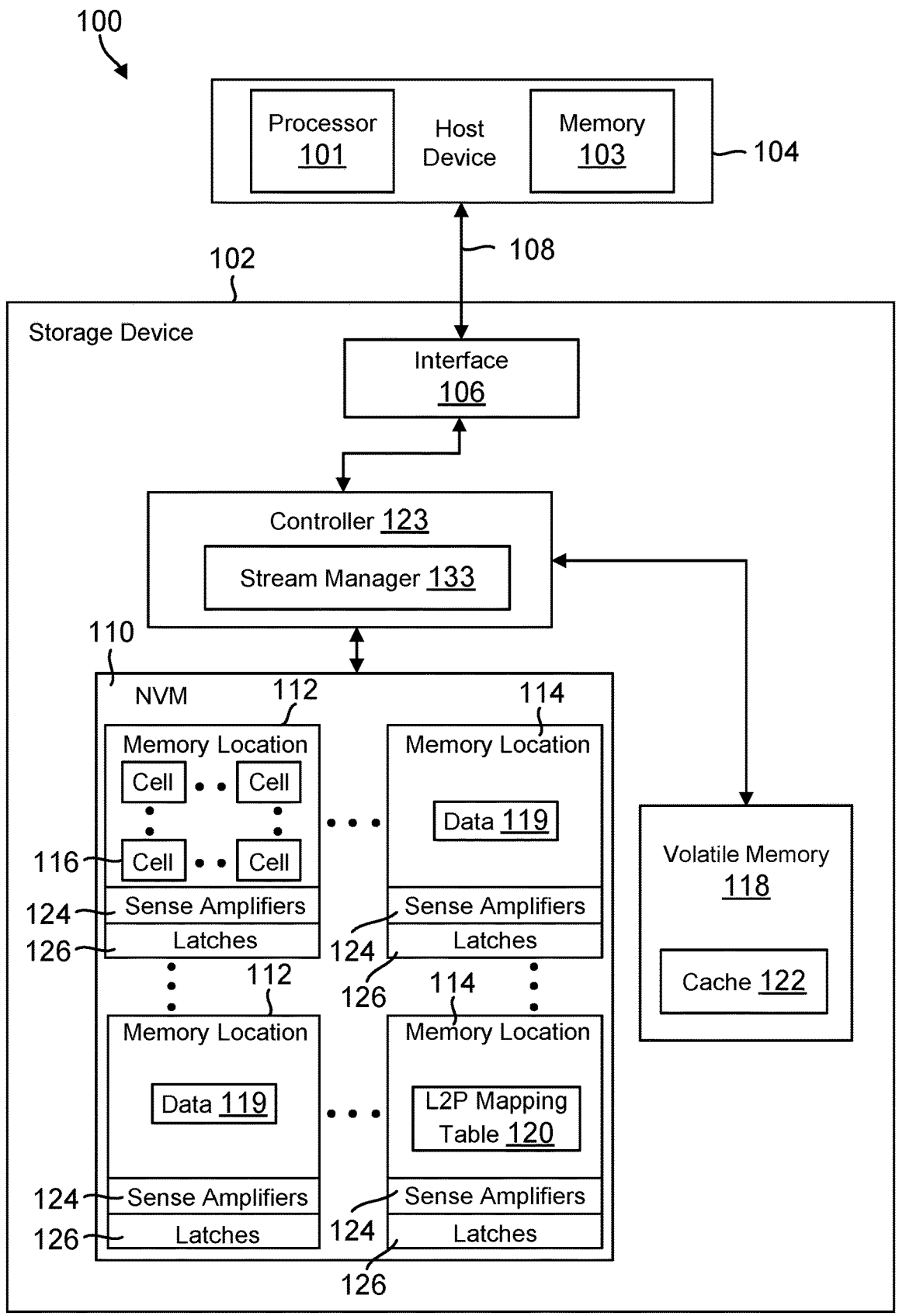
FIG. 1 is a block diagram illustrating an exemplary embodiment of a storage device in communication with a host.

In enterprise storage systems, multiple requests are received from multiple hosts to perform storage operations at a single storage system. The receiving entity (e.g., storage device) has a set of resources (e.g., memory, latch, random access memory) of which it has to allocate to the requesting hosts in a manner that maximizes performance and services all of the hosts in the shortest time possible.

In a use case, for example, a flash drive is connected to a laptop computer that attempts to read a significantly large media file (e.g., mpeg movie). After a number of read operations from the flash drive, a stream can been formed for playback on the laptop computer. There is a considerable amount of latency to read from a NAND memory die as it is a physical entity and transfer the read data to random access memory (RAM). If the storage device can predict what range of logical block addresses is actually going to be requested by the host and transfer that read data to the RAM by the time the host sends the next set of read requests, then it can be immediately given to consumption. In this regard, the read requests may not have to be sent to the NAND because depending on the size of the read requests, it may take anywhere between 10 ms to about 100 ms for the NAND read operation. This is a significant amount of time given the size of the read request and frequency.

As discussed above with respect to enterprise systems having a single system supporting multiple hosts, the amount of RAM resources available is finite. In a use case, where the storage device receives a read request from Host A and it has established a stream, and the storage device decides it is best to prefetch data for Host A because the storage device assumes Host A will be requesting for the next set of reads. However, prior to actually receiving a read request from Host A, another host, Host B, sends a read request to the storage device. The problem here is that the storage device has allocated the same resource for Host A that now has to be thrashed and reallocated for use by Host B. In this regard, the prior prefetched data for Host A has to be cleared (or erased) from the cache and the resource in the cache would be made available for use by Host B. When the actual read request arrives from Host A, the storage device creates an additional read request to the NAND, which causes performance of an additional read operation by the NAND. Due to the physical nature of NAND memories, each read operation and write operation performed by the NAND causes some damage to the NAND device. In this regards, these additional read operations over time are shortening the lifespan of the NAND memories at a quicker pace, which is undesirable.

In a multi-host environment, if the fetched RLA data for a host is not consumed for a long time, the backend resources may not be available to other hosts, which may lead to suboptimal performance. The present disclosure provides for maintaining track of the data access frequency and the latency of several hosts, and then run prefetch logic suited to service fast and frequent access hosts first, thereby using device resources optimally. The subject technology provides for a frozen time cache to support multi-host read requests, where the storage device can track the latency of a host submitting a read request, how frequent the host submits reads requests, and rank the hosts based on the latency and frequency parameters. In this regard, the host can prioritize prefetching of data for the ranked hosts that the storage device can predict as issuing the next read request. Because the storage device has finite memory resources, it is helpful to sort these host requests to allocate resources to hosts in an optimal manner to avoid cache thrashes or having additional senses to read. The storage device can track a frozen time for cached data, which refers to the amount of time the data has been stored in memory since the time the data was prefetched but the read request has not been received from the associated host, and whether a received read request resulted in a cache hit or cache miss.

The firmware can maintain a table for recording information related to the hosts for which data has been prefetched, the corresponding time counter, as well as information related to whether the prefetched data resulted in a cache hit or whether the prefetched data was thrashed to service other prefetch requests. The term "frozen time" as used herein can refer to an interval starting from the time the data is stored onto the RLA cache after investing all relevant backend resources until when the RLA cache is to be cleared, either because of a cache hit or due to thrashing of data to service another prefetch request.

The prefetch logic uses the information recorded in a frozen time table to service prefetch requests. For example, the prefetch requests are serviced in an ascending order of frozen time under the assumption that the corresponding host read commands arrive first. Similarly, if a host has a cache hit and a shorter frozen time than other hosts, then the prefetch requests for such a host are serviced first. Further, prefetching of data is prioritized for hosts that have cache hits even if their frozen time is higher. If the hosts have equal frozen time, then the hosts with larger amounts of prefetched data that resulted in a cache hit with respect to a previous host read command are prioritized as it implies greater promise of sequentiality.

Further, the storage device can appropriately bias its memory resources in prioritizing certain hosts based on the recorded frozen time against multiple host identifiers in a moving time window. For example, the host associated with a lesser frozen time may win a backend resource arbitration. Similarly, the storage device can positively bias other logic such as logical-to-physical (L2P) provisioning for logical address ranges associated with those hosts, which have a lower frozen time to enable better resource usage. In one embodiment, the storage device determines correct Transfer RAM (TRAM) allocation for reads and RLA based on the frozen time counter.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto-resistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 includes a controller 123. The controller may include a stream manager 133. The stream manager 133 may provide a designated storage stream allocation scheme that is adaptively optimized to serve a multitude of host platforms. For example, the stream manager 133 may support host read commands being received from multiple host devices (including the host device 104) and notify the controller 123 (and other components within the storage device 102) of when a stream has been formed (or promoted) for a particular host device. These embodiments can be applied to any multi-host environment. Among the many benefits of these embodiments are improvement of read latency and throughput, as well as Quality of Service (QoS) compatibility in both sequential and random read operation modes. Furthermore, these embodiments can be used to increase the hit rate of a read look ahead mechanism since the algorithm is optimized to a multi-host environment.

The host interface 106 is configured to interface the storage device 102 with the host device 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra-Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 can be used with a host (e.g., the host device 104), and both can operated under a standard or specification. One such specification is the Non-volatile Memory Express (NVMe) specification. NVMe is a scalable host controller interface designed to address the needs of Enterprise and Client systems that utilize peripheral component interface express (PCIe)-based solid state drives. For example, NVMe may be a logical device interface specification for accessing non-volatile storage attached via a PCIe bus. NVMe takes advantage of parallelism offered by semiconductor memory such as, but not limited to, SSDs. It is based on a paired submission and completion queue mechanism. Commands are placed by host software into a submission queue (SQ). Completions are placed into the associated completion queue (CQ) by the controller 123. Submission and completion queues are allocated either in host memory (e.g., memory 103) or device memory (e.g., volatile memory 118, cache 122, NVM 110).

The NVMe standard may introduce the NVMe virtualization environment. Virtualized environments may use an NVM subsystem with multiple controllers to provide virtual or physical hosts direct I/O access. The NVM subsystem is composed of primary controller(s) and secondary controller(s), where the secondary controller(s) depend on primary controller(s) for dynamically assigned resources. A host may issue the Identify command to a primary controller specifying the Secondary Controller List to discover the secondary controllers associated with that primary controller.

The NVMe system can be referred to as a multi-user system since it usually contains many submission queues that are associated with different host processors. This statement is relevant to any virtualized NVMe environment where multiple Hosts interact with single device. In any NVMe (non-virtualized and virtualized) environment having dozens of host applications using different submission queues over the PCIe bus, it is desired to improve the properties of storage devices to fit the multitude of "clients," as opposed to currently serving a single "client."

Storage devices usually hold a logical block address (LBA) to a physical block address (PBA) conversion mechanism, such that when a host asks for data from a specific LBA, the device allocates a corresponding PBA to which the data will reside. This conversion mechanism is also noted as Logical-to-Physical conversion. The management of such a conversion mechanism is not trivial, as this table constantly changes according to host operations and device current status and operations, such as garbage collection and read scrub.

In some embodiments, the host device 104 sends a stream of data to the storage system. As used herein, a "stream" represents a group of data that belong to identifiable sets of physical location and, hence, can be allocated and freed together. Each stream contains a specific pattern. So, streams enable data to be written and erased efficiently, which in turn reduces garbage collection and leads to reduced write amplification, as well as efficient flash utilization.

Legacy stream management mechanisms are designed to serve a single host. However, when serving a multitude of clients (hosts), these mechanisms may be suboptimal and may lead to delayed (sequential or random) read latencies and impaired throughput. The embodiments below can be used to incorporate an innovative concept that adapts the stream management of a storage device to a multi-host storage system, which improve stream management in a storage device that serves multiple clients.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from the controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a L2P mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
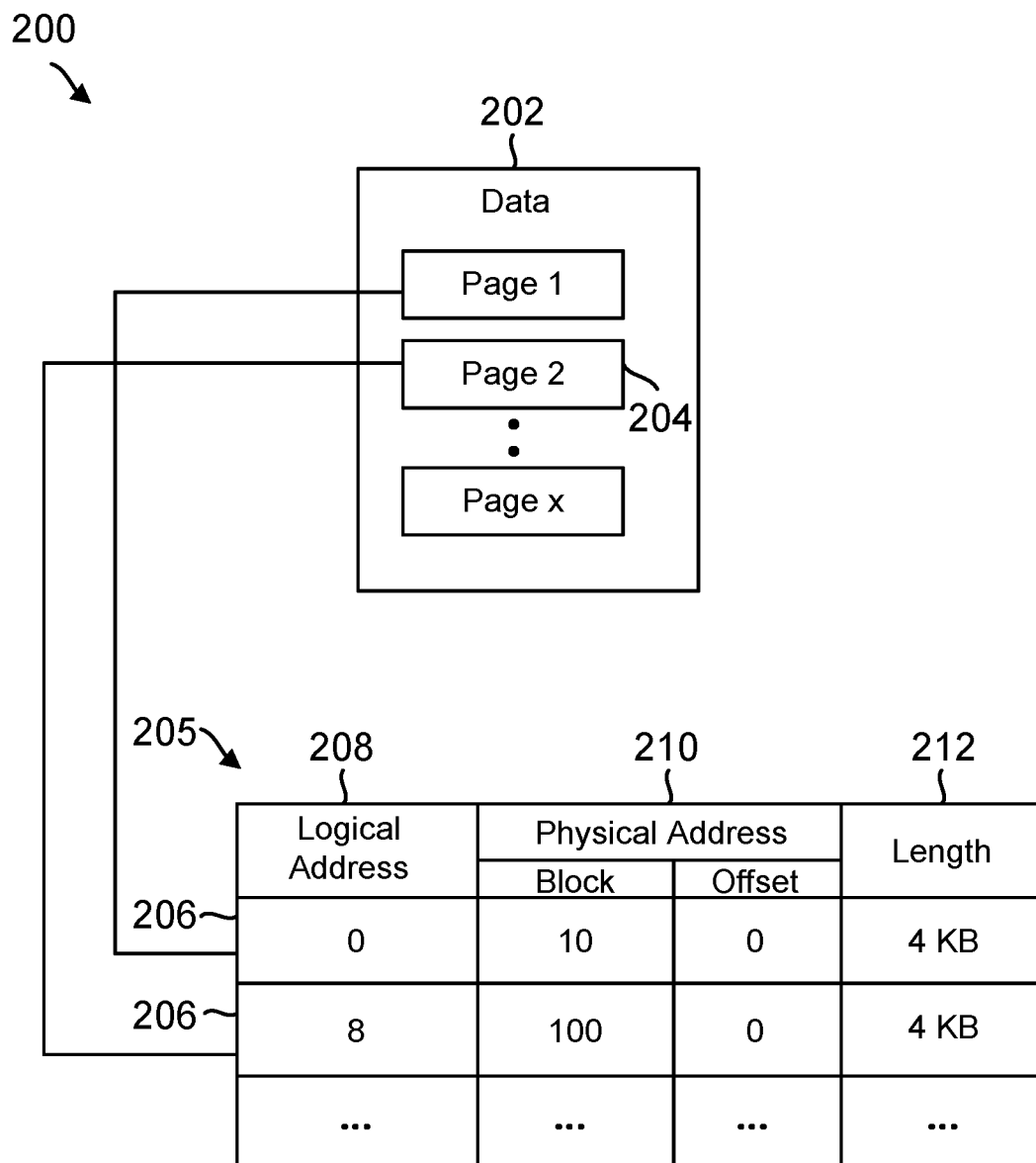
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device 104. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In some aspects, a portion of the host memory 103 may be used for a host memory buffer (HMB). The HMB may be a buffer that is allocated by the host device 104 for use of the controller 123. In some exemplary embodiments, the HMB is for exclusive usage of the controller 123. For example, the controller 123 may use the HMB to cache data. The host device 104 may guarantee that the data in the HMB can be valid and is obliged to notify the controller 123 before any operation that may cause data loss (e.g., power loss, host may need this buffer, etc., . . . ), in one exemplary embodiment. The host device 104 allows the controller 123 to acknowledge this operation before the data is lost, in one exemplary embodiment. In one exemplary embodiment, the host device 104 can perform an initial allocation of the HMB to the controller 123 when the controller 123 is initialized. The controller 123 is initialized when the storage device 102 is powered on, in one exemplary embodiment. The initial allocation may be compliant with NVMe; however, the initial allocation of HMB is not limited to NVMe.

The HMB may be used to store management tables. In one exemplary embodiment, the management tables include L2P tables (logical to physical mappings) and P2L tables (physical to logical mappings). The controller 123 can use the management tables to map logical addresses (LAs) to physical addresses (PAs). Such management tables can be used to directly map LAs to the PAs, or LAs can be mapped to intermediate or virtual addresses, which are mapped to PAs. In some exemplary embodiments, the logical addresses are logical block addresses, and the physical addresses are physical block addresses. Other variations are also possible.

The management tables may also be used to manage caching of data in locations other than in the non-volatile memory 110. In one exemplary embodiment, the controller 123 caches data in the HMB. For example, the controller 123 may use the HMB to cache data that is associated with some LAs (or range of LAs). The management tables may also be used to manage caching of data in the HMB. In one exemplary embodiment, the controller 123 caches data in the volatile memory 118. For example, the controller 123 may use the volatile memory 118 to cache data that is associated with some LAs (or range of LAs). The management tables may also be used to manage caching of data in the volatile memory 118. The volatile memory 118 is volatile memory, in one exemplary embodiment.

In operation, the host device 104 stores data in the storage device 102 by sending a write command to the storage device 102 specifying one or more logical addresses (e.g., LBAs) as well as a length of the data to be written. The host interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The host interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

In some aspects, the storage device 102 may prefetch data in anticipation of a next read command from the host device 104. The data prefetches may also be referred to as RLA data, and may result in reads to different dies or threads. RLA may be a mechanism for anticipating the next command that is going to come from the host device 104, which can be used to reduce the turn-around times on multiple commands. RLA may include a speculative read to flash when predicting the LBA range for the next command coming from the host device 104. The detection of a sequence for predicting the next command may be performed by an algorithm that considers sequences (e.g. for a file transfer) or other methods of predicting commands.

In some aspects, the cache 122 includes a RLA cache. The RLA cache allows data that may be requested by host device 104 to be stored in cache before a request is actually made by the host device 104 for that data. Where a host requests data having a particular LBA range, additional data having a LBA range that is sequential to the requested data may be stored in the RLA cache. Because the host device 104 may frequently request data that is logically sequential to the last requested data, there is a higher probability that the stored data will be requested. RLA data may also be selected in other ways based on host data usage patterns. If a random read arrives in the middle of a data prefetch, the effort spent on the RLA may be wasted since the prefetch data has to be discarded.

Enterprise drives typically service several hosts at once, many of which include low latency use cases. It would therefore be prudent to include variations of pre-fetch logic, such as RLA, to help reduce the NAND (e.g., NVM 110) to TRAM transfer latency for sequential streams. However, due to limited RAM resources and several host, it is beneficial to determine the order of hosts for which to pre-fetch data, based on host device parameters other than stream information, which result in the least turn-around time of servicing all hosts requesting reads. This is further underscored by including the fabric environments, as hosts that are located geographically farther may take longer time in responsiveness as well.

In some aspects, two hosts A and B, both of which are requesting reads from the storage device 102, comply with stream rules and sequentiality. In the current implementation, after stream creation, the pre-fetch logic calculates the range and size of each host, and then keeps the data in the cache 122 of whichever host was serviced first. However, if host A data was pre-fetched and host B host read command arrives first, the controller 123 will then have to clear the cache 122, generate a NAND read and service the host read command. As the cache 122 was also cleared to facilitate the data transfer of host B, another read has to be carried out again to service a host read command from host A when it arrives. This not only results in an extra read to the NAND, but also does not offer any reduction in latency even with the pre-fetch logic.

This problem is compounded when the storage device 102 is implemented in a multi-host environment in enterprise drives, where several hundred read requests via host read commands need to be serviced with a fixed amount of TRAM only. Such wasted NAND reads also alter the data retention and wear leveling assumptions calculated for the storage device 102. The subject technology therefore provides for maintaining track of the data access frequency and latency of several hosts, and then run a pre-fetch logic suited to service fast and frequent access hosts first, thereby using device resources optimally.

The controller 123 has logic that determines the RLA cache frozen time in retrieving the data for every host. Fetched RLA data not being consumed for a longer time can result in sub-optimal performance, especially when the same backend resources may not be made available for other hosts.

The controller 123 may determine wastage of backend resources from the cache frozen time based on the data access frequency and/or latency of multiple hosts since a data pipe can be stalled (e.g., stalled resources via flash channels and the die latches) due to the data being made available on the RLA cache but the host has not responded to pull it from the RLA cache.

The controller 123 can appropriately bias its resources in prioritizing certain hosts among many hosts in a multi-host environment over the NVMe fabric based on a generated table that lists frozen times against multiple host identifiers in a moving time window. For example, the host associated with a lesser frozen time may have priority over other hosts and win the backend resource arbitration.

In some cases, the controller 123 also may positively bias other logic such as L2P provisioning for logical address ranges associated to those hosts, which have the highest priority based on smaller frozen times to enable better resource usage. In some cases, the controller 123 may determine correct TRAM allocation for read operations and RLA operations based on the frozen cache time.

In some aspects, the controller 123 may use the determined frozen cache time to prioritize the host commands of those hosts in submission queues, which have averaged lesser frozen cache times. Over time, this mechanism can improve the QoS of the storage device 102.

The storage device 102 may leverage the fact that any unconsumed data leads to a cache build up, which in turn leads to frozen backend resources, because once the destination cache is full, the die group manager in the backend can stop issuing further die requests, thus creating a bottleneck. In some aspects, the controller 123 may determine and revert back to normal working conditions as a fallback mechanism if the QoS worsens over time.

The subject technology utilizes the turn-around time and frequency of data access parameters to rank the hosts and then use back-end resources optimally that result in high cache hits and fast servicing of all host read commands. The storage device 102 can run a frozen time counter for every host for which the device pre-fetches data onto the cache 122.

The frozen time can refer to the interval between data stored onto the cache 122 after investing all relevant back-end resources, until when the cache 122 is to be cleared, either because of a cache hit, or if the controller 123 thrashes the prefetched data to service another pre-fetch request. For example, if a host submits a host read command after 10 ms for which the storage device 102 already performed a RLA operation, then the host's prefetched data lies unutilized in the cache 122 for at least 10 ms (e.g., before host consumption or before the storage device 102 thrashes the prefetched data if the host did not send a corresponding host read command).

In some aspects, the cache utilization may be sub-optimal if a host responds late, and the overall backend resource utilization is sub-optimal if the host does not respond at all leading to thrashing of prefetched data. Likewise, the storage device 102 may maintain the frozen time table, utilization through response, and average the frozen time for every host over a moving time window when multiple hosts access the storage device 102 at any point in time.

In some use cases, a first host (e.g., Host 1) may be competing with a second host (e.g., Host 2) for backend resources, where the storage device 102 has a common 512 KB of RLA cache. If Host 1 blocks the flash channels with its pending host read command, where the storage device 102 prefetched data for Host 1 based on a prior host read command that is associated with a promoted stream, and Host 1 responds with a corresponding host read command after 50 ms, then Host 2 is automatically blocked from accessing the storage device memory until host 1 is served. For example, the storage device 102 may not perform any RLA operations for Host 2 since the cache 122 is being utilized to prefetch data for Host 1. The flash channels and memory dies may be kept idling during this time, and may not serve any host read command from Host 2, thus adversely impacting the QoS of the storage device 102.

The subject technology assumes that both legacy and current approaches in RLA mechanisms or any other prefetch logic are implemented in the storage device 102. The subject technology provides for determining which prefetch operations for hosts are prioritized over others in a multi-host environment. Similarly, the subject technology can be extended to multiple hosts interacting with the storage device 102.

In some aspects, the multi-host environment may include the storage device 102 concurrently interacting with multiple hosts, where each of the hosts can respond with a certain delay. For example, Host 1 may always send a host read command submission (as a sequential follow up) after 10 ms, Host 2 may send its host read command as a sequential follow up after 20 ms, and so on, where each host can send with same command sizes and same (or substantially the same) submission times.

In such multi-host environment, the storage device 102 (via the controller 123) can identify the frozen time of the data in the cache 122 for each host, and bias its memory resources for servicing some of the hosts in advance of other hosts. In some aspects, the controller 123 may monitor the completion time of the host read commands that are submitted at the same time with the same command type by different hosts.

In some aspects, the storage device 102 may receive host read commands, where other parameters such as command type (e.g., random, sequential) and/or time of submission, are observed to be constant between many hosts. In this regard, the controller 123 can positively bias those hosts whose frozen time is less. In some aspects, these issued biases due to varying frozen times between hosts may be reflected within the command completion set issued by the storage device 102 for various hosts.

In some aspects, the firmware executing on one or more processors of the controller 123 can maintain a frozen time table that may include a listing of hosts for which data has been prefetched, a corresponding frozen time counter, as well as whether the prefetched data resulted in a cache hit or a cache thrash (e.g., to serve other interjecting host read commands). In some aspects, when the controller 123 executes the prefetch logic, the controller 123 may refer to the frozen time table and generates an informed decision. In some aspects, the frozen time table may identify each host with a host identifier, where the host read command may provide indication of a host via the host identifier or a network identifier.

In a multi-host environment, the controller 123, via the prefetch logic, may take corresponding actions when the prefetch logic is executed to perform RLA operations. As discussed above, the controller 123 can refer to the frozen time table when a prefetch request is received (or the controller 123 determines that data should be prefetched for a promoted stream). In some aspects, the controller is configured to keep track of various ranges of addresses being read (also referred to as "potential stream candidates"), and waits for a threshold of consecutive addresses to have I/O operations performed on. After exceeding the threshold, the stream manager 133 may promote them into streams, and then applies prefetching rules. This avoids investing resources in prefetching for one-off prefetching requests or random prefetching requests.

In some aspects, the frozen time table may indicate that all hosts either have cache hits or cache thrashes. In this case, the controller 123 determines to service the prefetch requests in ascending order based on the corresponding frozen times with the assumption that the corresponding host read commands arrive first (or in a similar order).

In some aspects, the frozen time table may indicate that the subject host has a cache hit and a shorter frozen time than other hosts included in the frozen time table. In this regard, the controller 123 determines to service the prefetch request for the subject host given its lowest cache frozen time and prefetches the data accordingly.

In some aspects, the frozen time table may indicate that the subject host has a cache thrash, but a shorter frozen time than other hosts included in the frozen time table. Since this implies that the time at which the subject host may request data is unknown, the controller 123 may prioritize the prefetching of data for hosts that have cache hits even if their frozen time is relatively higher.

In some aspects, the frozen time table may indicate that all listed hosts have equal frozen times. In this case, the controller 123 can refer to the amount of prefetched data that was a cache hit in the previous host read command, and then prioritizes the hosts with a larger value (in the amount of prefetched data) as this may imply a greater likelihood of sequentiality.

In some embodiments, the storage device 102 may decide on whether to stop the frozen time counter and thrash (or discard) the data. For example, a host may submit a host read command more than once, for which no entry is present in frozen time table. In this regard, the controller 123 may not disturb the cache 122 until the requesting host satisfies criteria for prefetching data (e.g., stream detection/promotion). Once the pre-requisites for prefetching data are met, the controller 123 may thrash any existing prefetched data in the cache 122, cease the count with the frozen time counter, and update the table by adding a new entry with data access information relating to the requesting host. In some aspects, the controller 123 prefetches the data for the requesting host and initiates the frozen time counter to track the time interval between the time the data was prefetched onto the cache 122 and the time at which the prefetched data is pulled by the requesting host with a host read command.

In one embodiment, the controller 123 may receive a host read command from a host with an entry in the frozen time table. For example, if the entry indicates a prior cache thrash, then the prefetched data in the cache 122 is not disturbed and retained. However, if the entry indicates a prior cache hit, then the prefetched data is thrashed, the frozen time counter is stopped, and the requested data is prefetched onto the cache 122.

In one embodiment, the controller 123 may receive a host read command from a same host as that of the prefetched data, however, the host read command indicates a different range than that of the prefetched data (e.g., a cache miss). Since this may imply that the host may have broken sequentiality with the prefetched data due to the host read command requesting for different data, the controller 123 stops the frozen time counter, and executes the prefetch logic to serve a prefetch request of the next prioritized host. The initial host may not be considered for prefetching until the host satisfies the prefetching criteria (e.g., presence of data sequentiality or promotion of a formed stream).

Depending on the amount of TRAM available, the device can maintain multiple prefetch data slots, in a moving time window, for multiple hosts. In some aspects, multiple streams can be maintained for a same host, in which the controller 123 can track a lookup table that includes a stream identifier in addition to the corresponding host identifier.

The subject technology provides advantages over legacy approaches in prefetching of data in multi-host environments by achieving improved read performance for invested RLA caches and backend resources (e.g., flash channels, die latches), and further enabling a multi-host storage device platform where slower hosts can still receive allocated resources when host read commands related to faster hosts are proactively completed ahead of time. The subject technology benefits multiple hosts having their read requests serviced with minimal latency compared to latencies observed in a legacy round-robin mechanism for sharing RLA resources. The utilization of a frozen time counter in the subject technology helps achieve more accurate predictions of the order of prefetching operations as the frozen time counter is updated frequently to maintain fresh frozen times.

Figure 3:
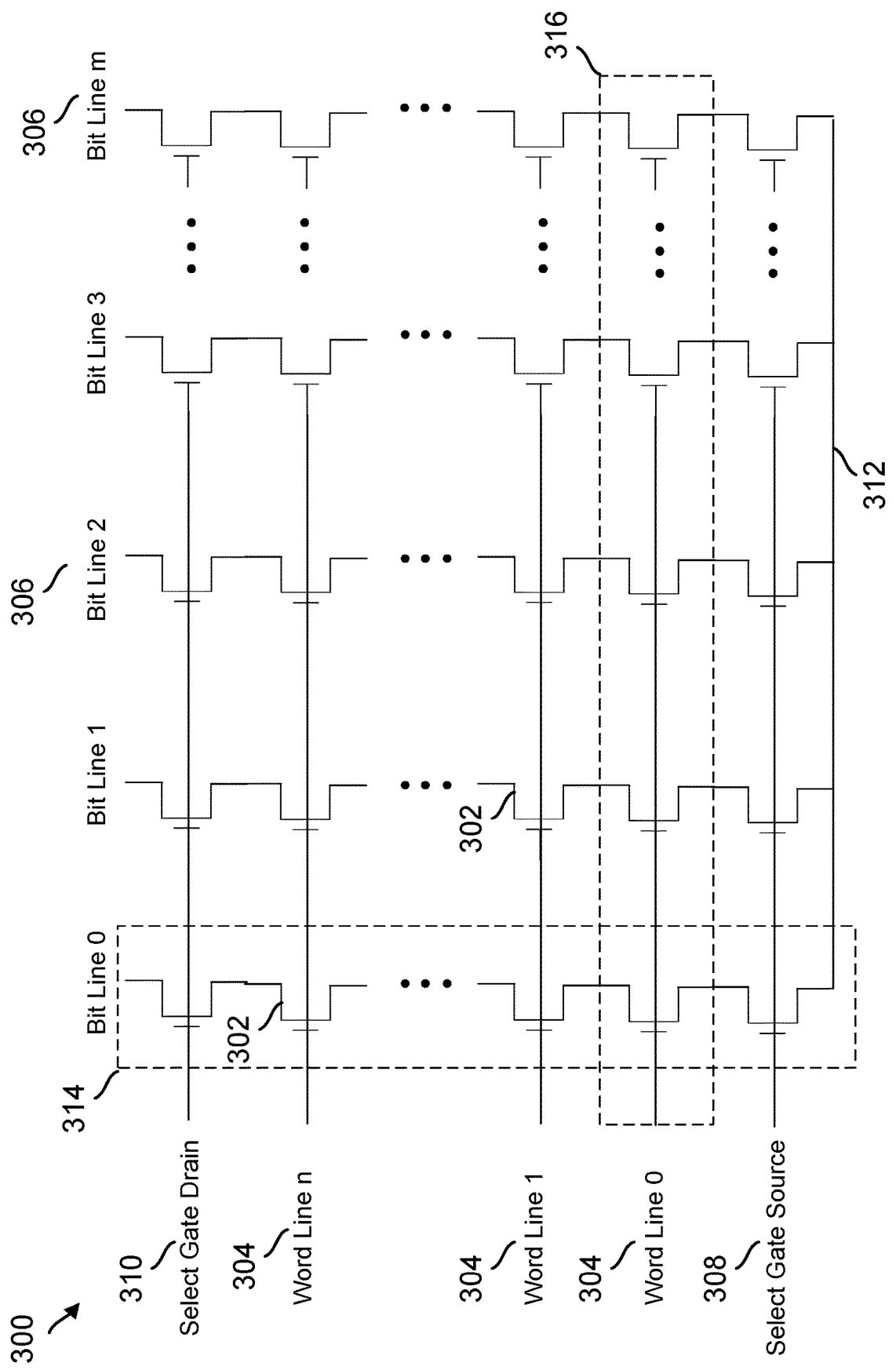
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
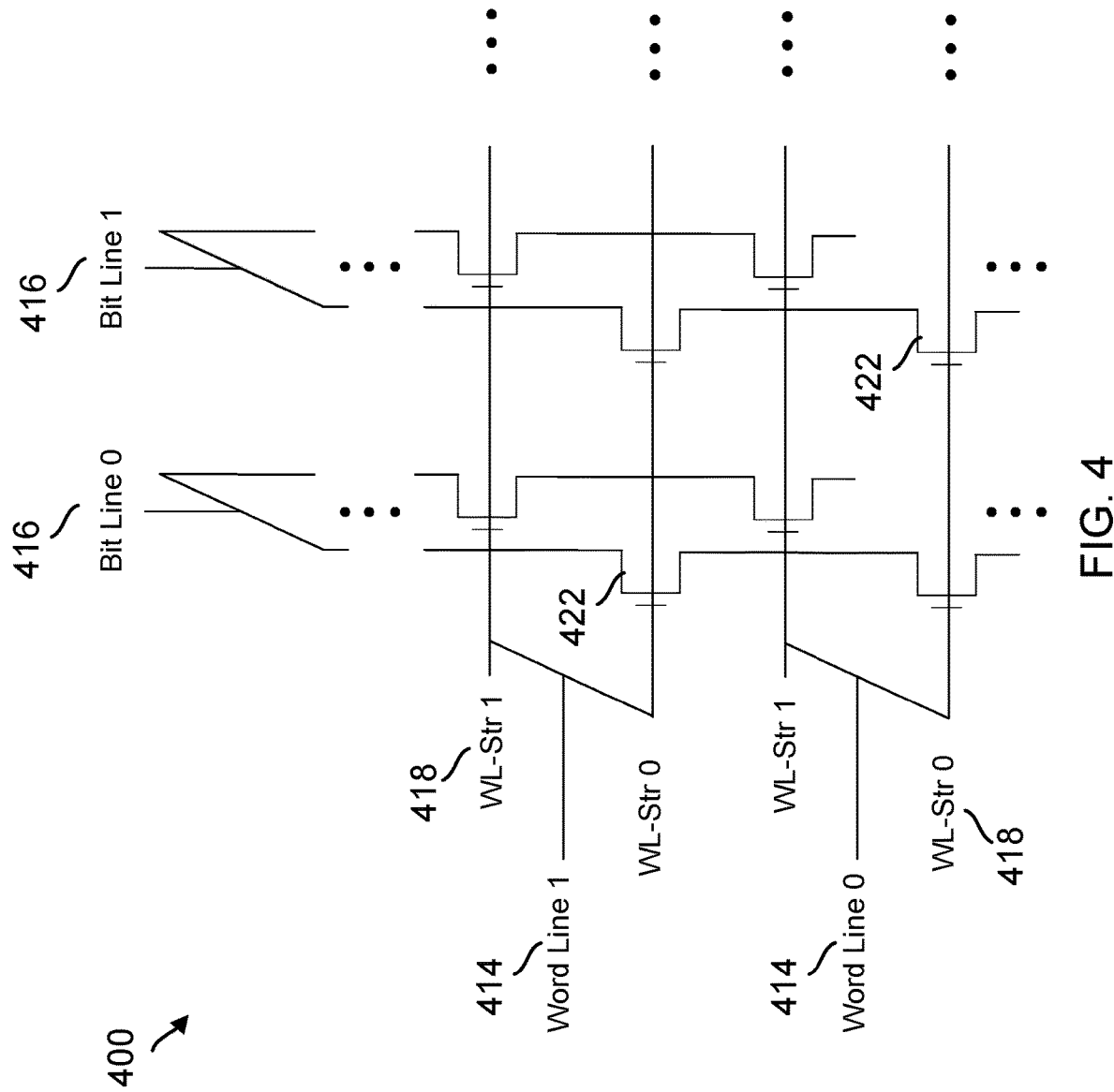
FIG. 4 is a conceptual diagram illustrating an example of a three dimensional array of memory cells in the storage device of FIG. 1.

FIG. 4 illustrates an example of a three-dimensional (3D) NAND memory array 400 of cells 422. Cells 422 may correspond to cells 116 in the NVM 110 of FIG. 1. As in the 2D memory array 300 of FIG. 3, multiple cells 422 may be coupled to word lines 414 and bit lines 416. However, in the 3D memory array 400, the word lines 414 may each include multiple word line strings 418, and the bit lines 416 may be connected to each of the word line strings 418. Similarly, SGS cells and SGD cells (not shown) may respectively connect the memory cells in each word line string 418 to the source line (not shown) and bit lines 416. Thus, 3D memory array 400 may store more individually accessible pages of data on each word line 414 (e.g. in word line strings 418) than 2D memory array 300. While the 3D memory array 400 illustrated in FIG. 4 includes an example of two word line strings 418 for each word line 414, the word lines 414 may include other numbers of word line strings (e.g. four WL-Strs 0-3) in other examples. The architecture of FIG. 4, or variations thereof, may be used in 3D NAND implementations including Bit Cost Scalable (BiCS) flash memory for ultra-high density storage devices.

Figure 5:
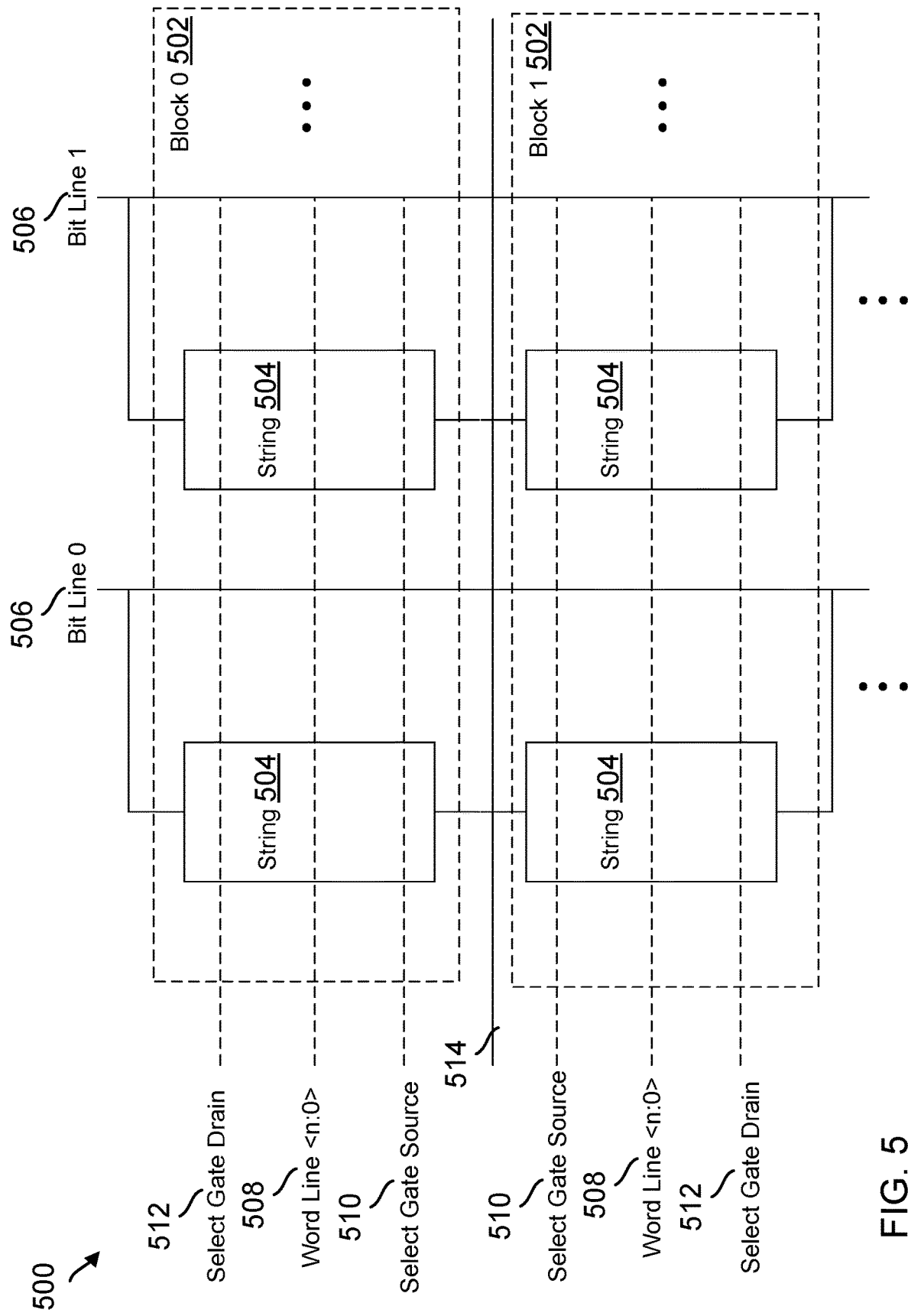
FIG. 5 is a conceptual diagram illustrating an example of an array of blocks in the storage device of FIG. 1.

FIG. 5 illustrates an example of a NAND memory array 500 of blocks 502 including multiple strings 504. Blocks 502 may correspond to blocks of a die 114 in the NVM 110 of FIG. 1, and strings 504 may each correspond to string 314 in FIG. 3. As in the memory array 300 of FIG. 3, each string 504 may include a group of memory cells each coupled to a bit line 506 and individually coupled to respective word lines 508. Similarly, each string may include a SGS cell 510 and SGD cell 512 which respectively connects the memory cells in each string 504 to a source line 514 and bit line 506.

When the controller 123 reads data from or writes data to a page 316 of cells 302 (i.e. on a word line 304, 508), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 508 until the cell reaches the threshold voltage, and during an erase operation, the controller may send a command to apply an erase voltage to the block 502 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 508 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 508 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 508 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 6:
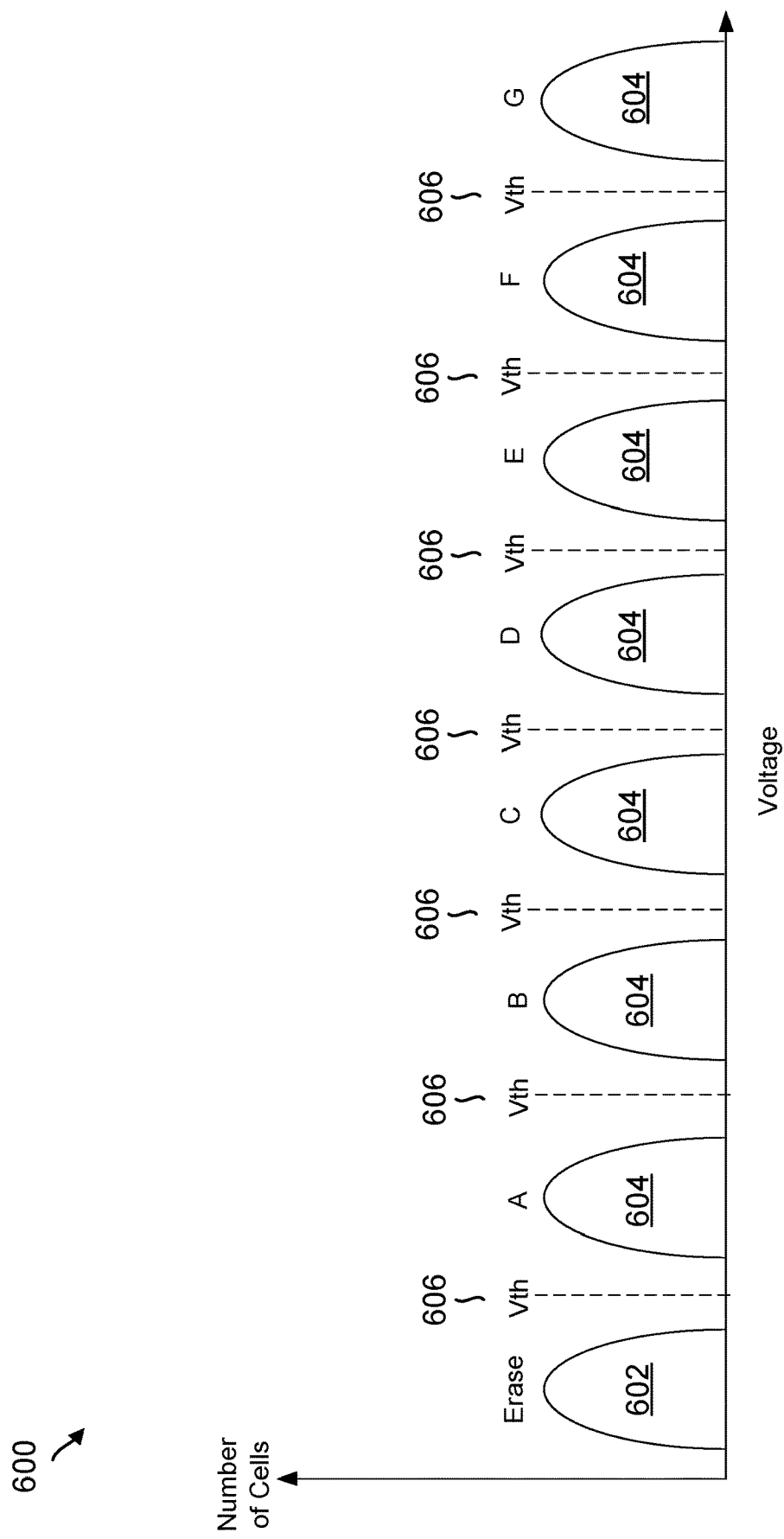
FIG. 6 is a graphical diagram illustrating an example of a voltage distribution chart for triple-level cells in the storage device of FIG. 1.

FIG. 6 illustrates an example of a voltage distribution chart 600 illustrating different NAND states for TLCs (e.g. cells 116, 302) storing three bits of data (e.g. logic 000, 001, etc. up to logic 111). The TLCs may include an erase state 602 corresponding to logic '111' and multiple program states 604 (e.g. A-G) corresponding to other logic values '000-110'. The program states 604 may be separated by different threshold voltages 606. Initially, the cells 116, 302 may be in the erase state 602, e.g. after the controller 123 erases a block 502 including the cells. When the controller 123 program LPs, MPs, and UPs as described above, the voltages of the cells 116, 302 may be increased until the threshold voltages 606 corresponding to the logic values to be stored are met, at which point the cells transition to their respective program states 604. While FIG. 6 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 508 into one of the program states 604, the controller may perform incremental step pulse programming (ISPP) over a number of programming loops or ISPP cycles. For example, a programming voltage (e.g. a high voltage) may be applied to the selected word line 304, 508, a pass through voltage (e.g. a high voltage lower than the programming voltage) may be applied to the other word lines 304, 508, a bit line program voltage (e.g. a low voltage) may be applied on the bit lines 306, 506 connected to the selected cells being programmed on the selected word line, and a bit line inhibit voltage (e.g. a high voltage) may be applied on the bit lines 306, 506 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 508 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 7:
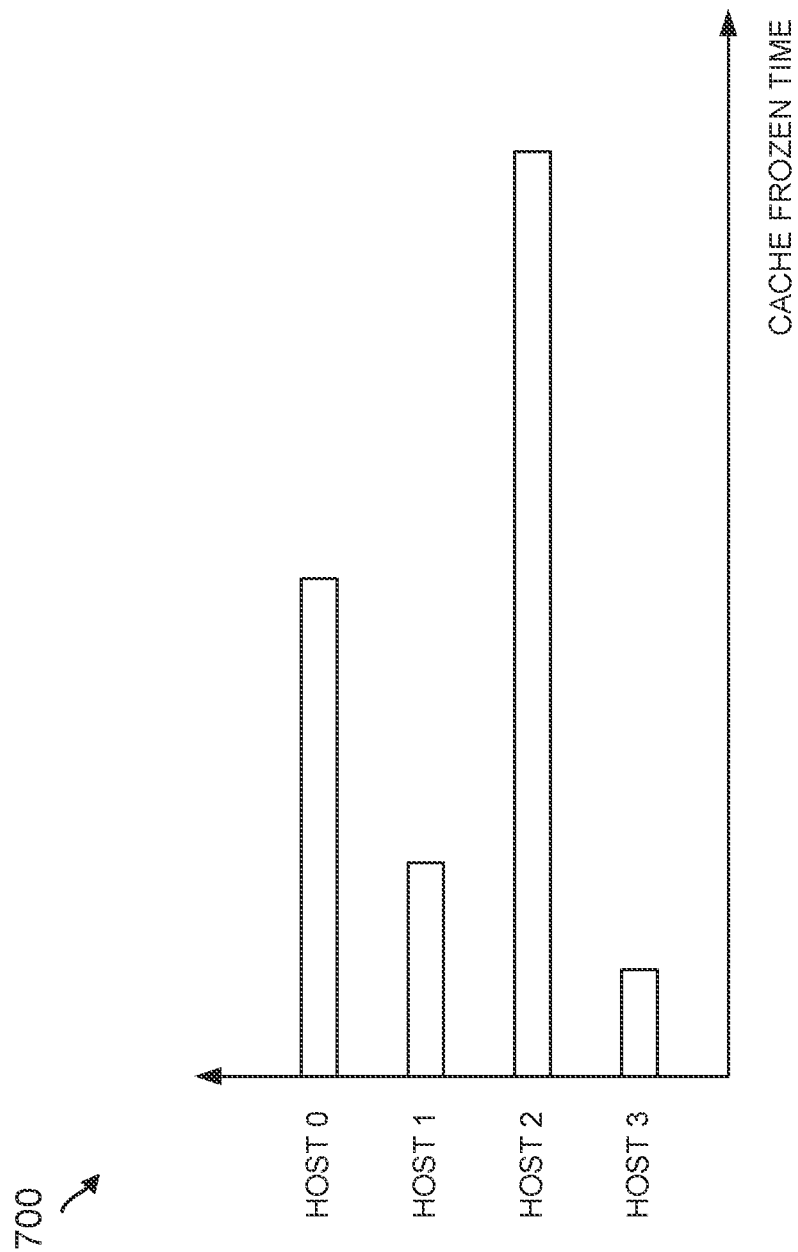
FIG. 7 is a timing diagram illustrating example frozen times for multiple hosts.

FIG. 7 is a timing diagram 700 illustrating example frozen times for multiple hosts. The timing diagram 700 depicts four frozen times for four corresponding hosts (denoted as "Host 0," "Host 1," "Host 2," Host 3"). As illustrated in FIG. 7, Host 3 has the least cache frozen time accrued since its prefetched data was stored onto the cache 122 (e.g., RLA cache), and Host 2 has the highest cache frozen time.

The controller 123 of FIG. 1 may receive a request from Host A and accesses a frozen time table to determine whether Host A has an entry in the frozen time table. The controller 123 can process the request by sending the requested data to Host A when Host A is determined not to have an entry in the frozen time table. The controller 123 may continue processing read requests from Host A over time, and may be notified by a stream manager module in the storage device that a stream associated with Host A has been formed. Once Host A has consumed the data and the controller 123 determines that the local RAM is empty, the controller 123 may prefetch data for Host A because a stream for Host A has been promoted. The stream manager may indicate, to the controller, a logical block address range in the non-volatile memory that corresponds to data belonging to the promoted stream so that the controller 123 can prefetch that data. Once the data has been prefetched by the controller, the controller 123 initiates a frozen time counter. The controller 123 will thereafter wait for an actual read request from Host A and the frozen time counter will accrue to reflect the amount of time that has elapsed since the data was prefetched onto the data cache.

In some aspects, the controller 123 receives a read request from the same host (e.g., Host A) for which data was prefetched. In response to the read request, the controller 123 provides the prefetched data to Host A for immediate consumption. The controller 123 may update the frozen time counter to reflect the amount of time elapsed between the time at which the data was prefetched onto a data cache and the time at which the data cache was cleared as well as update the frozen time table to indicate that the read request for Host A resulted in a cache hit.

In some aspects, the controller 123 receives a read request from a different host (e.g., Host B) after resources used to prefetch data for allocated to Host A. In this regard, the prefetch data in the data cache has to be cleared to make the resources available to Host B because the controller 123 would need to use the same resources to service the read request from Host B. In this case, the controller 123 updates the frozen time counter and updates the frozen time table to indicate that the prefetch request for Host A resulted in a cache thrash. Thereafter, the controller 123 services the read request from Host B using resources allocated to Host B.

In some aspects, the controller 123 can receive subsequent read requests from Host A, of which the controller 123 may continue the stream by servicing the subsequent read requests from Host A and continue prefetching data for Host A. In some aspects, the controller 123 may thereafter receive indication that a stream has been formed for Host B, of which the controller 123 may add an entry for Host B into the frozen time table to track frozen times of prefetched data for Host B. Over time, the frozen time table is populated with additional hosts that have formed streams and the controller 123 is tracking the responsiveness of each host for prioritizing the prefetching of data for immediate consumption by these hosts and thereby improve the read performance of the storage device.

Figure 8:
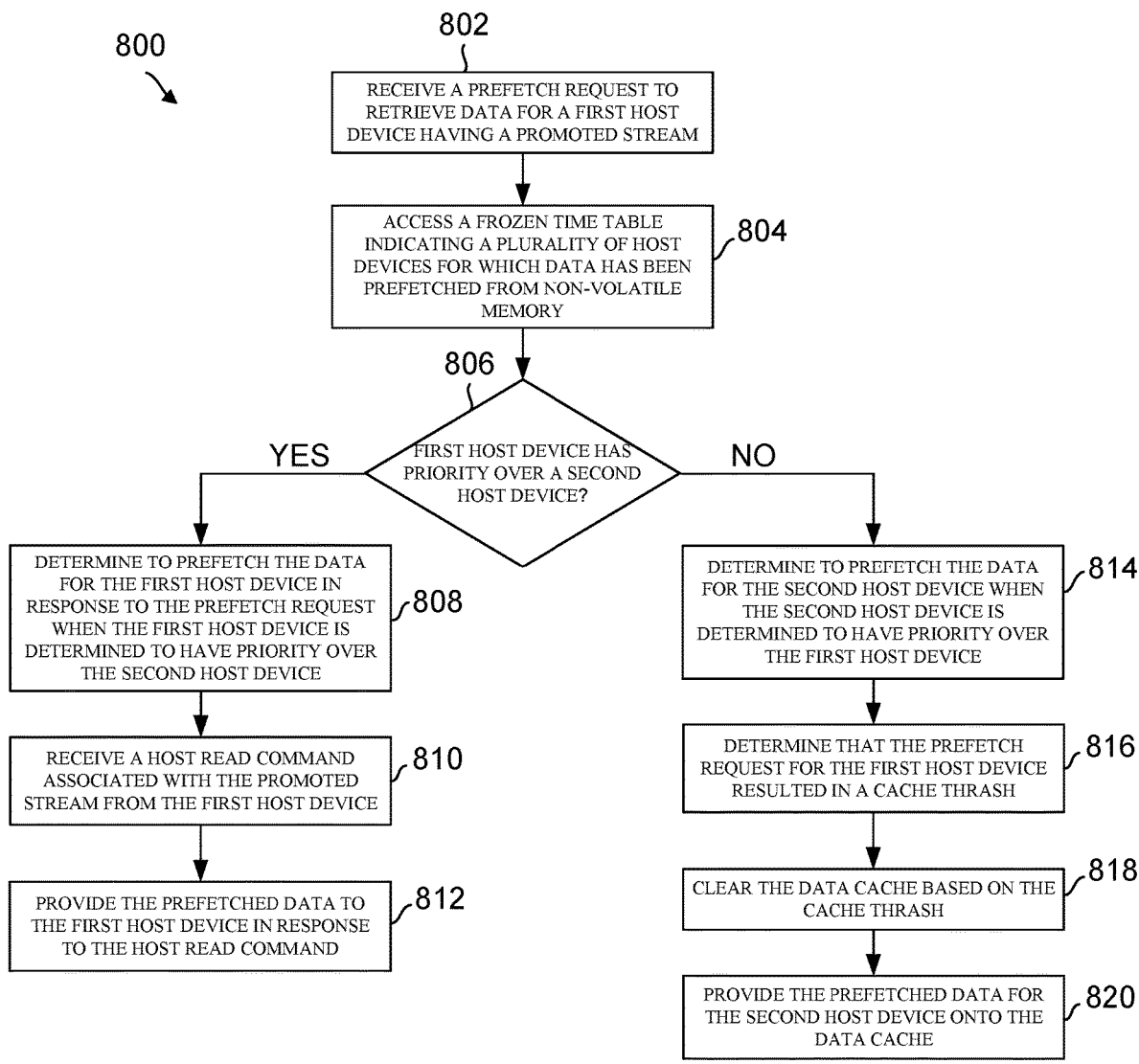
FIG. 8 is a flow chart illustrating an example process for frozen time cache for supporting multi-host read requests, as performed by the storage device of FIG. 1.

FIG. 8 is a flow chart illustrating an example process 800 for frozen time cache for supporting multi-host read requests, as performed by the storage device of FIG. 1. For example, the process 800 can be carried out in a storage device 102 such as the one illustrated in FIG. 1. Each of the steps in the flow chart can be controlled using a controller as described below (e.g. the controller 123), by a component or module of the controller, or by some other suitable means. Although the process 800 is described with reference to two hosts, the process 800 may be implemented with a multi-host environment beyond two hosts.

At 802, the controller may receive a prefetch request to retrieve data for a first host device having a promoted stream. At 804, the controller may access a frozen time table indicating a plurality of host devices for which data has been prefetched from the memory. In some aspects, the frozen time table further indicates a plurality of frozen times associated with respective ones of the plurality of host devices. In some aspects, the frozen time table identifies each of the plurality of host devices by a corresponding host identifier. In some aspects, the frozen time table further indicates a plurality of streams associated with a same host device of the plurality of host devices for which data has been prefetched from the memory, wherein the frozen time table identifies each of the plurality of streams by a corresponding stream identifier and associates each of the plurality of streams with a host identifier of the same host device.

In some embodiments, the frozen time table is generated (or populated) with acquired frozen times for every prefetched data that is cached. For example, the controller may determine a frozen time for prefetched data upon storing the prefetched data in a data cache for each of the plurality of host devices. In some aspects, the frozen time corresponds to a time interval between a first time at which the data is prefetched from the memory and transferred to the data cache and a second time at which the data cache is cleared based on one or more data access parameters associated with the first host device. In some aspects, the one or more data access parameters include a first data access parameter that indicates a latency of time for a host device to send a host read command following the prefetch request and a second data access parameter that indicates how frequent the host device submits host read commands.

In some aspects, the controller may update an entry in the frozen time table with the determined frozen time for a corresponding one of the plurality of host devices. In some aspects, the controller may generate a prioritized listing of the plurality of host devices, in which each of the plurality of host devices is prioritized based on a corresponding frozen time of the plurality of frozen times. In some aspects, the frozen time table includes the prioritized listing of the plurality of host devices.

At 806, the controller may determine whether the first host device has priority over a second host device included in the frozen time table based on a corresponding one of the plurality of frozen times and one or more data access parameters associated with the first host device. If the first host device has priority over the second host device, then the process 800 proceeds to block 808. Otherwise, the process 800 proceeds to block 814.

In some aspects, the controller may determine whether the data that has been prefetched for the first host device resulted in a cache hit or a cache thrash based on the one or more data access parameters. In some aspects, the data cache is cleared based on the frozen time table indicating that prefetched data for a corresponding one of the plurality of host devices resulted in a cache hit. In other aspects, the data cache is cleared based on the frozen time table indicating that prefetched data for a corresponding one of the plurality of host devices resulted in a cache thrash to service a host read command from one of the plurality of host devices different from the first host device.

In some implementations, the first host device may be associated with a first frozen time of the plurality of frozen times and the second host device may be associated with a second frozen time of the plurality of frozen times. With the use of the frozen times and cache hit/cache thrash indications, the controller can determine which host has priority to have its prefetch request serviced. In some aspects, the first host device has priority over the second host device when the first frozen time is smaller than the second frozen time. In other aspects, the second host device has priority over the first host device when the first frozen time is smaller than the second frozen time and the frozen time table indicates that the first host device has a cache thrash and the second host device has a cache hit.

In some aspects, the first frozen time is equivalent to the second frozen time, and the frozen time table indicates that the first host device has a first amount of prefetched data that was a cache hit in a prior host read command and the second host device has a second amount of prefetched data that was a cache hit in a prior host read command, wherein the first host device has priority over the second host device when the first amount of prefetched data is greater than the second amount of prefetched data.

At 808, the controller may determine to prefetch the data for the first host device in response to the prefetch request when the first host device is determined to have priority over the second host device. In some aspects, the controller may initiate a frozen time counter at a time at which the prefetched data is transferred onto the data cache.

At 810, the controller may receive a host read command associated with the promoted stream from the first host device. In some aspects, the controller may receive host read commands from the plurality of host devices in a submission queue. In turn, the controller may prioritize the host read commands in the submission queue based on the plurality of frozen times associated with the plurality of host devices. In some aspects, the controller may update an entry in the frozen time table that corresponds to the first host device to indicate that the prefetched data resulted in a cache hit based on the host read command. At 812, the controller may provide the prefetched data to the first host device in response to the host read command.

At 814, the controller may determine to prefetch the data for the second host device when the second host device is determined to have priority over the first host device. In some aspects, the second host device has priority over the first host device when the first frozen time is smaller than the second frozen time and the frozen time table indicates that the first host device has a cache thrash and the second host device has a cache hit. At 816, the controller may determine that the prefetch request for the first host device resulted in a cache thrash due to the controller instead servicing the prefetch request for the second host device. At 818, the controller may clear the data cache based on the cache thrash. At 820, the controller may provide the prefetched data for the second host device onto the data cache.

Figure 9:
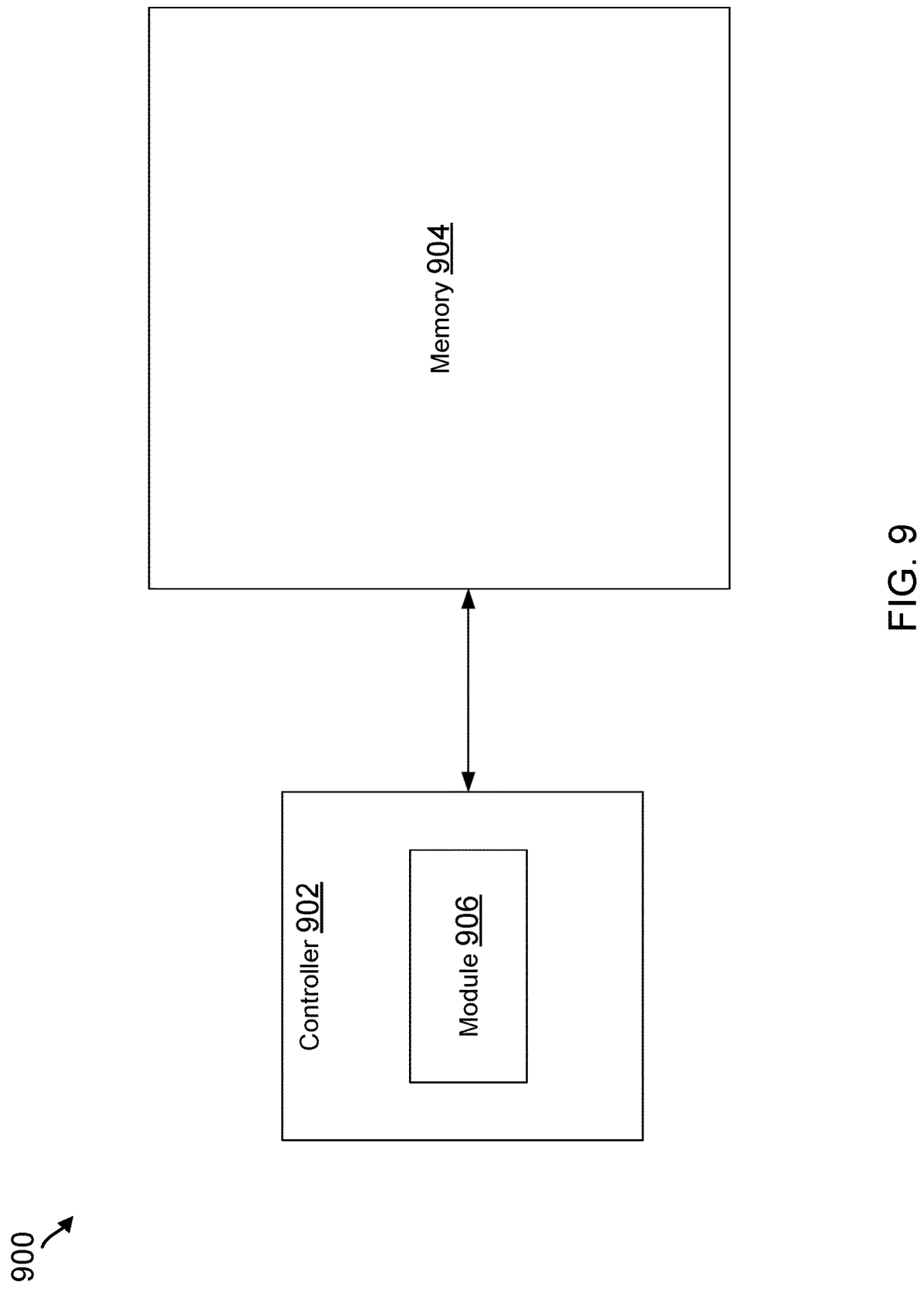
FIG. 9 is a conceptual diagram illustrating an example of a controller that facilitates frozen time cache for supporting multi-host read requests in the storage device of FIG. 1.

FIG. 9 is a conceptual diagram 900 illustrating an example of a controller 902 that writes data to a block using a two-stage programming sequence in the storage device 102 of FIG. 1. As illustrated in FIG. 9, a controller 902 coupled to a memory 904 in a storage device. For example, controller 902 may correspond to controller 123 and memory 904 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 902 may include a module 906 that may provide a means for receiving a prefetch request to retrieve data for a first host device having a promoted stream. For example, the module 906 may perform the aforementioned process described at 802. In one configuration, the module may provide a means for accessing a frozen time table indicating a plurality of host devices for which data has been prefetched from non-volatile memory, where the frozen time table further indicates a plurality of frozen times associated with respective ones of the plurality of host devices, e.g., as described in connection with 804. In one configuration, the module 906 may provide a means for determining whether the first host device has priority over a second host device included in the frozen time table based on a corresponding one of the plurality of frozen times and one or more data access parameters associated with the first host device, e.g., as described in connection with 806. The module 906 may provide a means for determining to prefetch the data for the first host device in response to the prefetch request when the first host device is determined to have priority over the second host device. For example, the module 906 may perform the aforementioned process described at 808. In one configuration, the module may provide a means for receiving a host read command associated with the promoted stream from the first host device, e.g., as described in connection with 810. The module 906 may provide a means for providing the prefetched data to the first host device in response to the host read command. For example, the module 906 may perform the aforementioned process described at 812.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory; and
   a controller coupled to the memory and configured to:
      receive a prefetch request to retrieve data for a first host device;
      access a frozen time table indicating a plurality of host devices for which data has been prefetched from the memory, the frozen time table further indicating a plurality of frozen times associated with respective ones of the plurality of host devices;
      determine whether the first host device has priority over a second host device included in the frozen time table, wherein the first host device is associated with a first frozen time of the plurality of frozen times, the second host device is associated with a second frozen time of the plurality of frozen times, and the first host device is determined to have the priority over the second host device in response to either:
         the second frozen time being smaller than the first frozen time, and the frozen time table indicating that the second host device has a cache thrash and the first host device has a cache hit, or the second frozen time being equivalent to the first frozen time, the frozen time table indicating that the first host device has a first amount of prefetched data that was hit in a prior host read command and the second host device has a second amount of prefetched data that was hit in a prior host read command, and the first amount of prefetched data being greater than the second amount of prefetched data;

determine to prefetch the data for the first host device in response to the first host device being determined to have the priority over the second host device;

receive a host read command from the first host device; and provide the prefetched data to the first host device in response to the host read command.

2. The storage device of claim 1, wherein the controller is further configured to determine whether the data that has been prefetched for the first host device resulted in a cache hit or a cache thrash based on one or more data access parameters.

3. The storage device of claim 1, wherein the frozen time table identifies each of the plurality of host devices by a corresponding host identifier.

4. The storage device of claim 1, wherein the frozen time table further indicates a plurality of streams associated with a same host device of the plurality of host devices for which data has been prefetched from the memory, wherein the frozen time table identifies each of the plurality of streams by a corresponding stream identifier and associates each of the plurality of streams with a host identifier of the same host device.

5. The storage device of claim 1, wherein the controller is further configured to:

determine a frozen time for prefetched data upon storing the prefetched data in a data cache for each of the plurality of host devices, the frozen time corresponding to a time interval between a first time at which the data is prefetched from the memory and transferred to the data cache and a second time at which the data cache is cleared based on one or more data access parameters; and update an entry in the frozen time table with the determined frozen time for a corresponding one of the plurality of host devices.

6. The storage device of claim 5, wherein the controller is further configured to initiate a frozen time counter at a time at which the prefetched data is transferred onto the data cache.

7. The storage device of claim 5, wherein the data cache is cleared based on the frozen time table indicating that prefetched data for a corresponding one of the plurality of host devices resulted in a cache hit.

8. The storage device of claim 5, wherein the data cache is cleared based on the frozen time table indicating that prefetched data for a corresponding one of the plurality of host devices resulted in a cache thrash to service a host read command from one of the plurality of host devices different from the first host device.

9. The storage device of claim 1, wherein the controller is further configured to:

generate a prioritized listing of the plurality of host devices, each of the plurality of host devices being prioritized based on a corresponding frozen time of the plurality of frozen times.

10. The storage device of claim 9, wherein the frozen time table comprises the prioritized listing of the plurality of host devices.

11. The storage device of claim 1, wherein the controller is further configured to:

receive host read commands from the plurality of host devices in a submission queue; and prioritize the host read commands in the submission queue based on the plurality of frozen times associated with the plurality of host devices.

12. The storage device of claim 1, wherein the controller is further configured to update an entry in the frozen time table that corresponds to the first host device to indicate that the prefetched data resulted in a cache hit based on the host read command.

13. The storage device of claim 1, wherein the controller is further configured to determine whether the first host device has the priority over the second host device included in the frozen time table based on one or more data access parameters associated with the first host device, the one or more data access parameters comprising a first data access parameter that indicates a latency for a host device to send a host read command following the prefetch request and a second data access parameter that indicates how frequent the host device submits host read commands.

14. The storage device of claim 1, wherein the host read command is associated with a promoted stream of the first host device.

15. A storage device, comprising:

non-volatile memory; and a controller coupled to the non-volatile memory and configured to:

receive a prefetch request to retrieve data for a first host device;

access a frozen time table indicating a plurality of host devices for which data has been prefetched from the non-volatile memory, the frozen time table further indicating a plurality of frozen times associated with respective ones of the plurality of host devices;

determine to prefetch the data for the first host device in response to the prefetch request based on the first host device having a higher priority than a second host device included in the frozen time table, wherein the first host device is associated with a first frozen time of the plurality of frozen times, the second host device is associated with a second frozen time of the plurality of frozen times, and the higher priority of the first host device is in response to either:

the second frozen time being smaller than the first frozen time, and the frozen time table indicating that the second host device has a cache thrash and the first host device has a cache hit, or the second frozen time being equivalent to the first frozen time, the frozen time table indicating that the first host device has a first amount of prefetched data that was hit in a prior host read command and the second host device has a second amount of prefetched data that was hit in a prior host read command, and the first amount of prefetched data being greater than the second amount of prefetched data; receive a host read command from the first host device; and provide the prefetched data to the first host device in response to the host read command.

16. The storage device of claim 15, wherein the controller is further configured to determine whether the data that has been prefetched for the first host device resulted in a cache hit or a cache thrash based on one or more data access parameters.

17. The storage device of claim 15, wherein the controller is further configured to:

determine a frozen time for prefetched data upon storing the prefetched data in a data cache for each of the plurality of host devices, the frozen time corresponding to a time interval between a first time at which the data is prefetched from the non-volatile memory and transferred to the data cache and a second time at which the data cache is cleared based on one or more data access parameters; and update an entry in the frozen time table with the determined frozen time for a corresponding one of the plurality of host devices.

18. The storage device of claim 15, wherein the host read command is associated with a promoted stream of the first host device.

19. A storage device, comprising:

means for receiving a prefetch request to retrieve data for a first host device;

means for accessing a frozen time table indicating a plurality of host devices for which data has been prefetched from non-volatile memory, the frozen time table further indicating a plurality of frozen times associated with respective ones of the plurality of host devices;

means for determining whether the first host device has priority over a second host device included in the frozen time table, wherein the first host device is associated with a first frozen time of the plurality of frozen times, the second host device is associated with a second frozen time of the plurality of frozen times, and the first host device is determined to have the priority over the second host device in response to either:

the second frozen time being smaller than the first frozen time, and the frozen time table indicating that the second host device has a cache thrash and the first host device has a cache hit, or the second frozen time being equivalent to the first frozen time, the frozen time table indicating that the first host device has a first amount of prefetched data that was hit in a prior host read command and the second host device has a second amount of prefetched data that was hit in a prior host read command, and the first amount of prefetched data being greater than the second amount of prefetched data;

means for determining to prefetch the data for the first host device in response to the first host device being determined to have the priority over the second host device;

means for receiving a host read command from the first host device; and means for providing the prefetched data to the first host device in response to the host read command.

20. The storage device of claim 19, wherein the host read command is associated with a promoted stream of the first host device.

* * * * *